H. SHACKLETON.
SPINNING, TWISTING, AND ANALOGOUS MACHINE.
APPLICATION FILED AUG. 4, 1913.
1,090,757.
Patented Mar. 17, 1914.
6 SHEETS—SHEET 6.
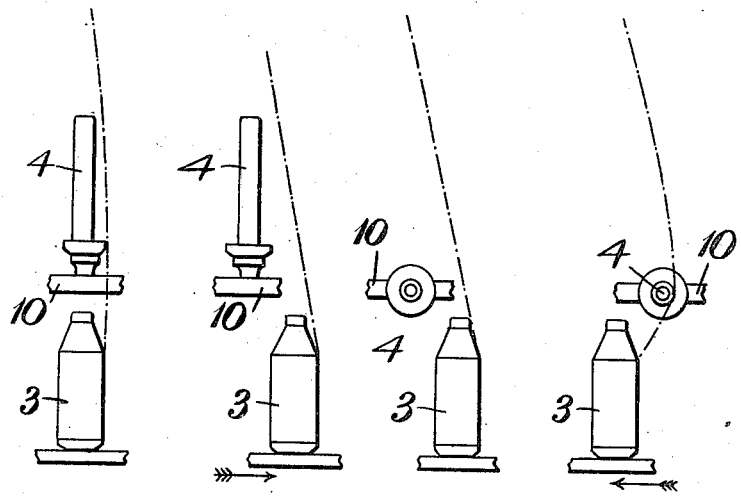
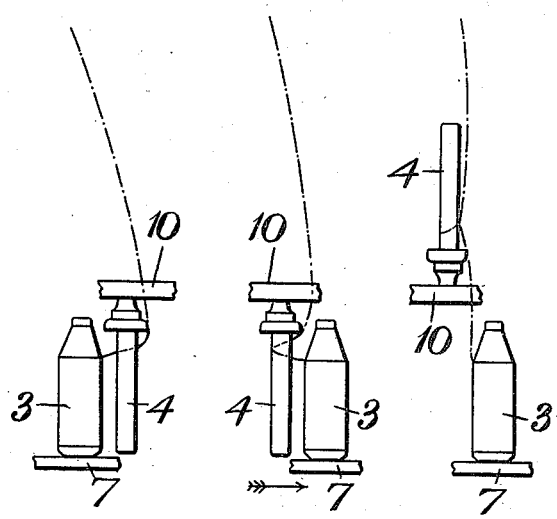
Witnesses;  FIG.16.
Inventor
Herbert Shackleton
by James L. Norris,
Attorney

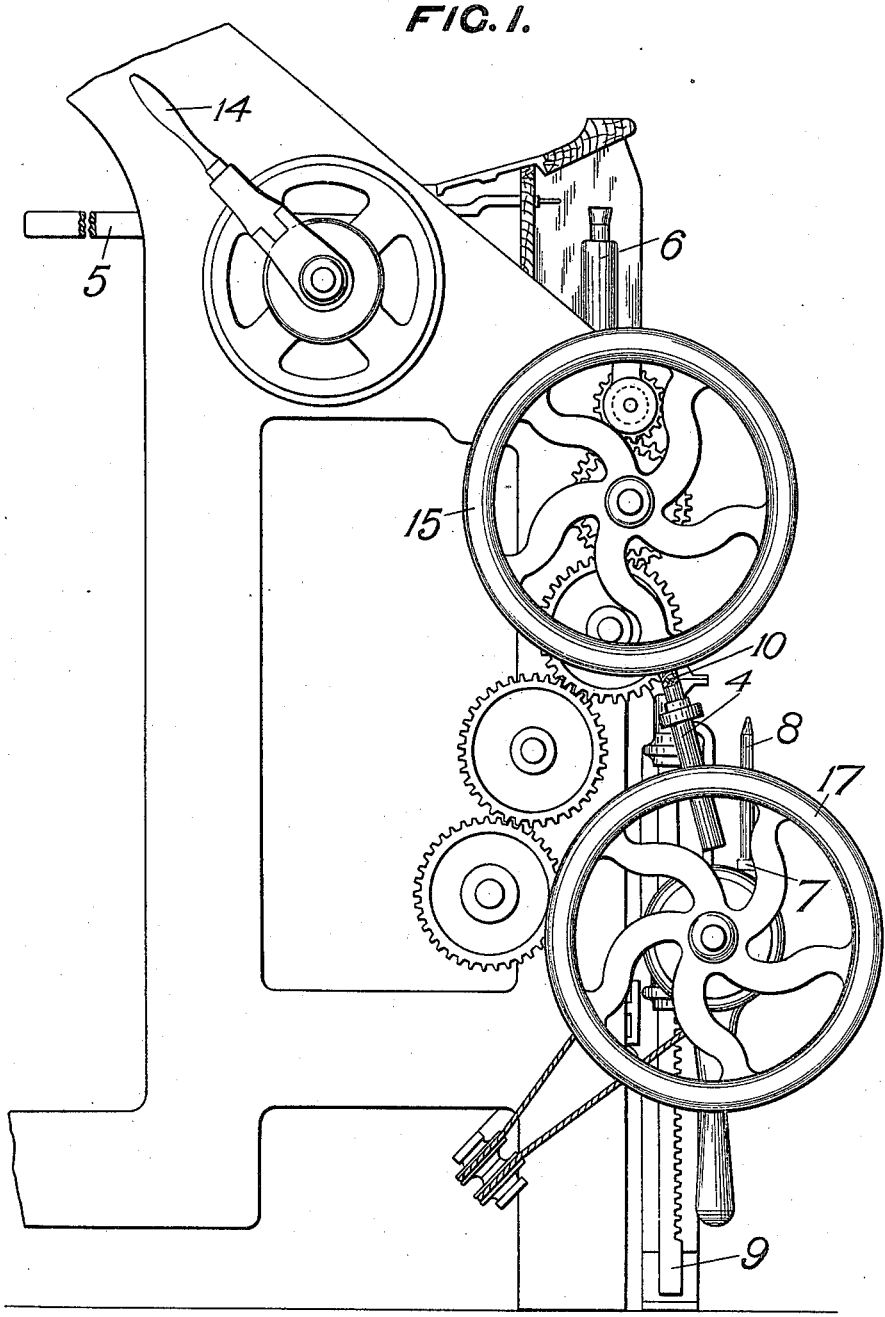

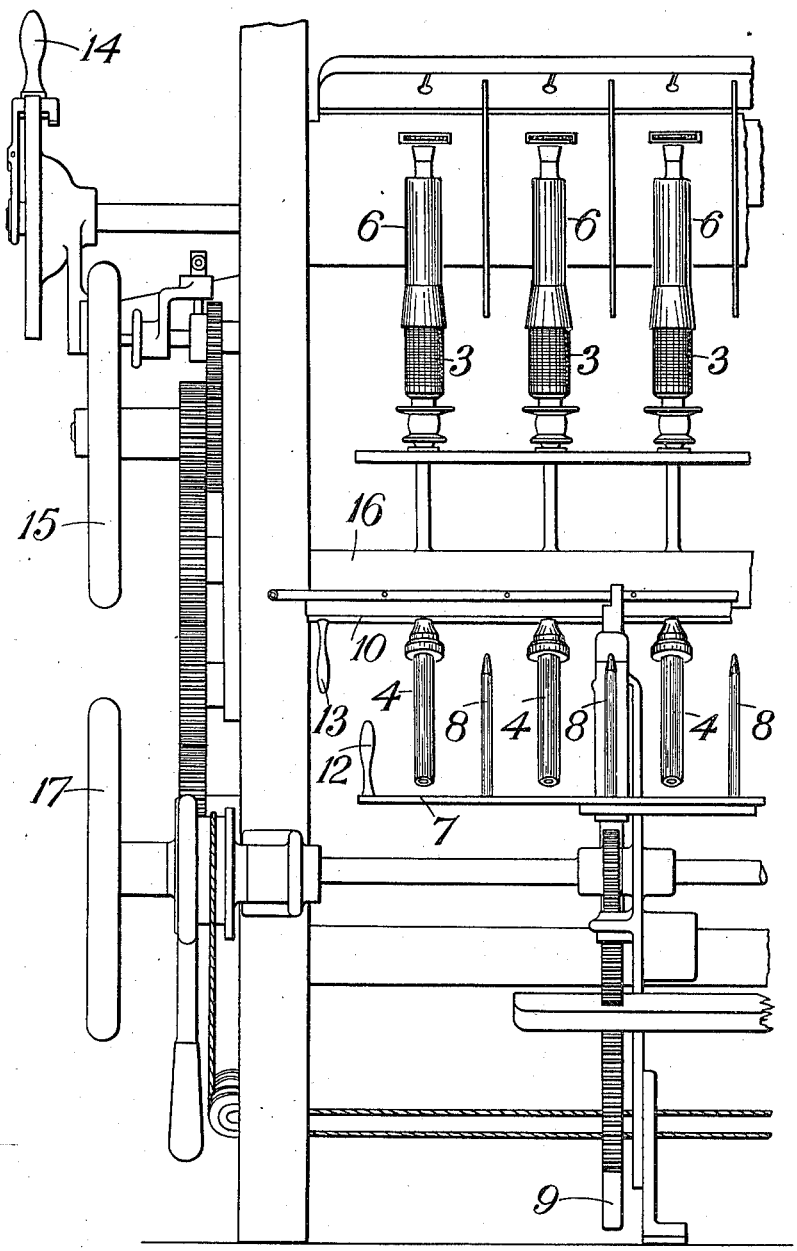

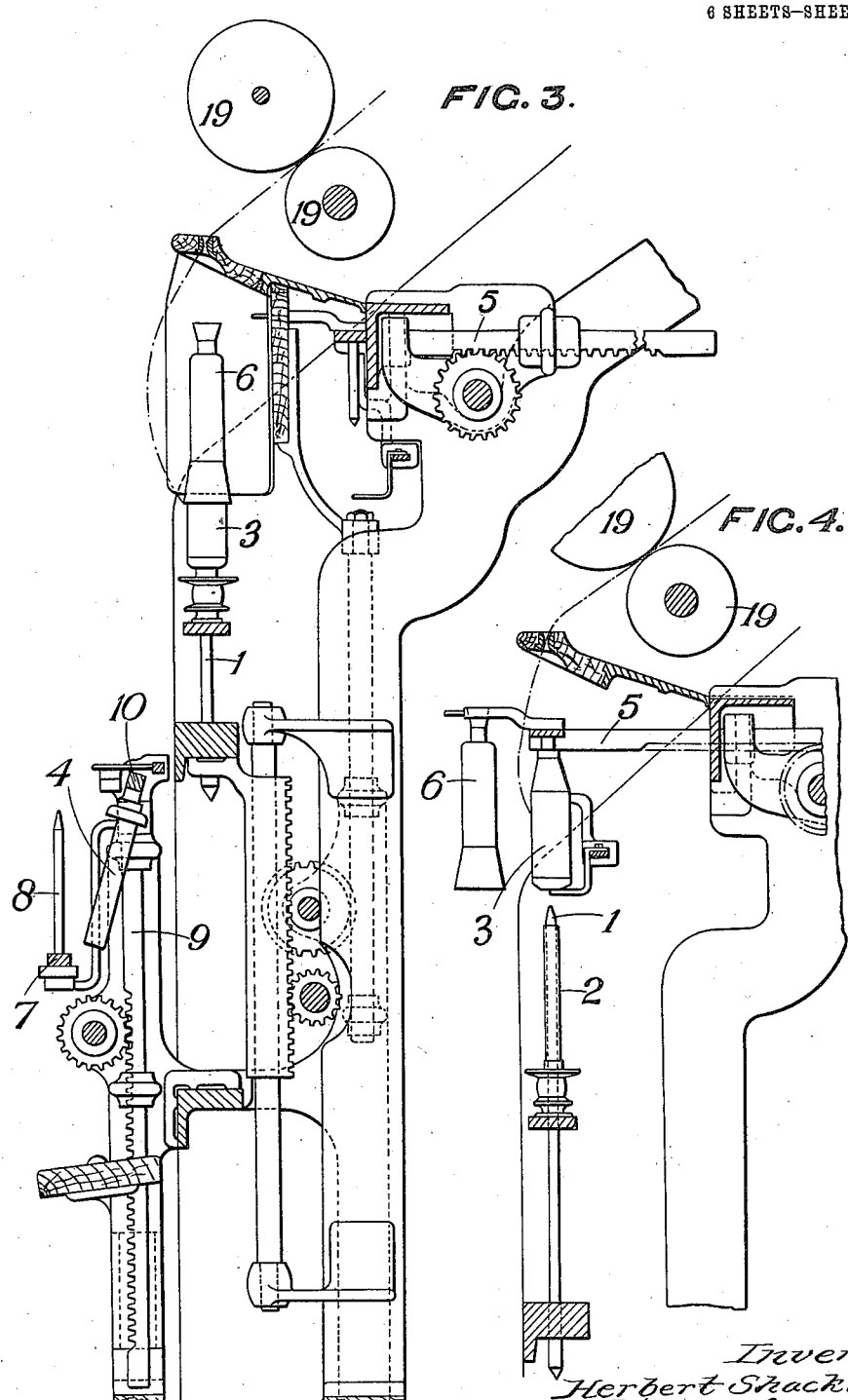

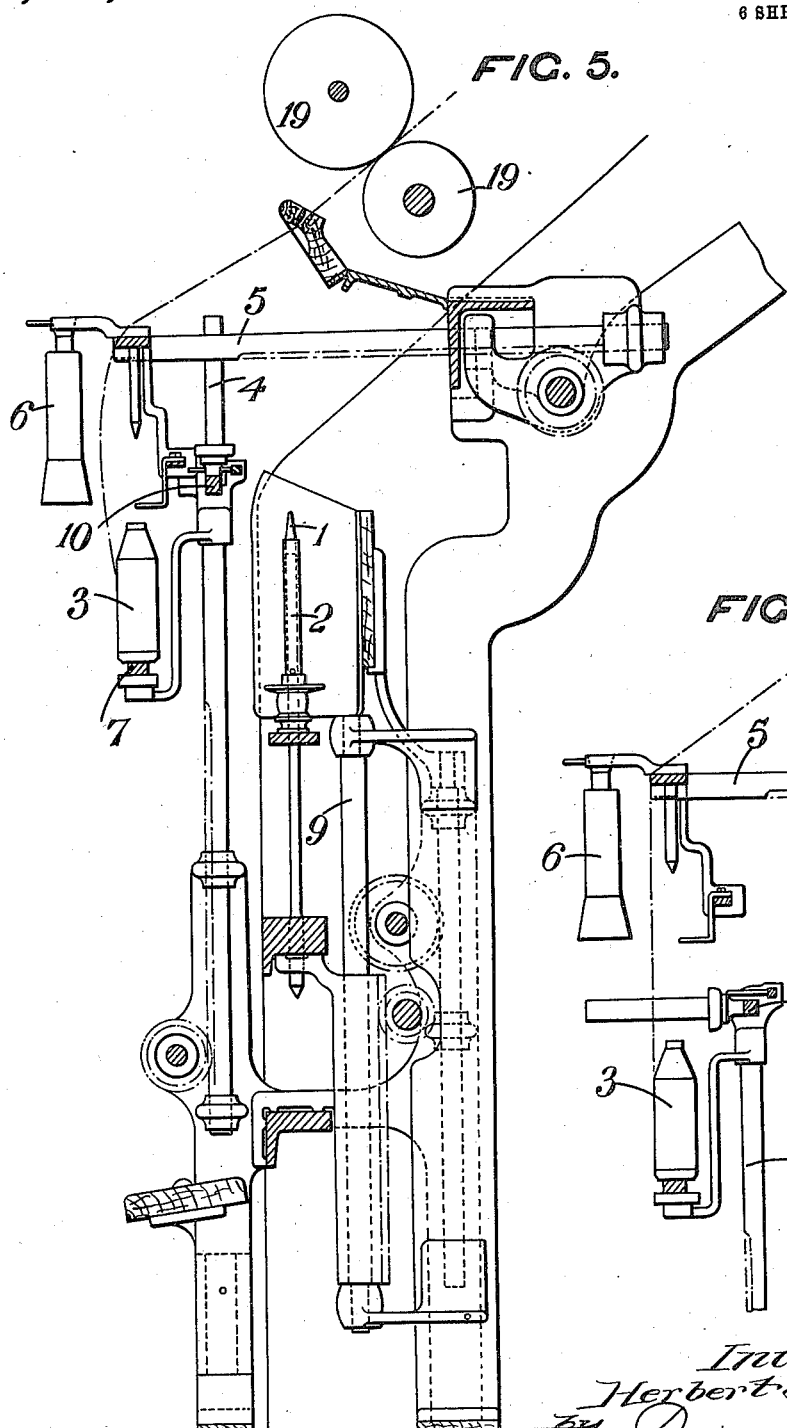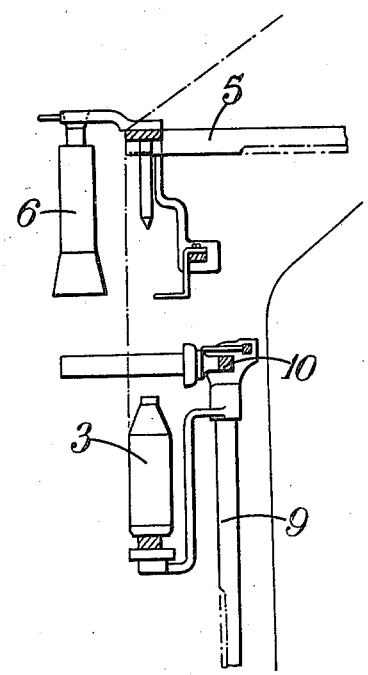

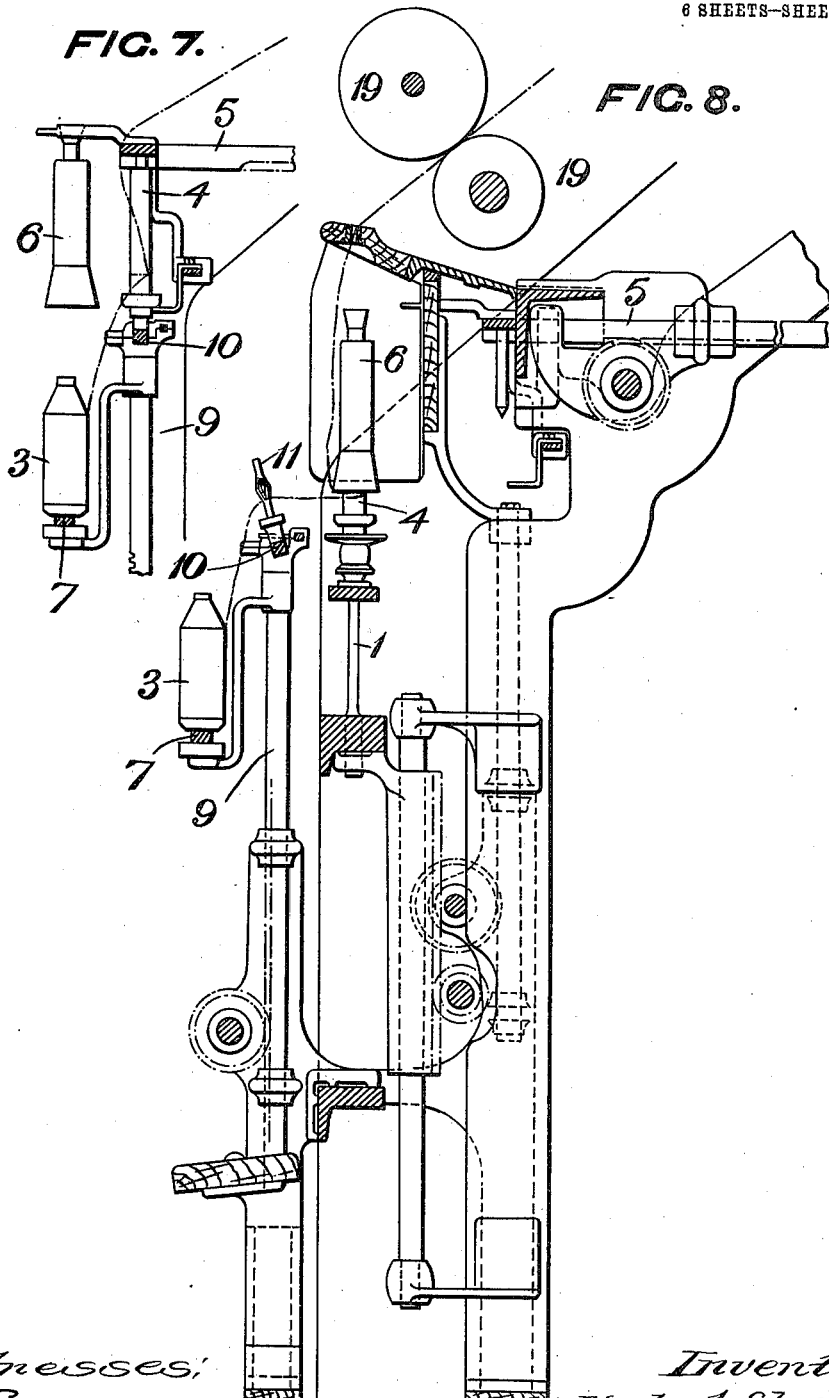

UNITED STATES PATENT OFFICE.

HERBERT SHACKLETON, OF MALSIS MOUNT, KEIGHLEY, ENGLAND.

SPINNING, TWISTING, AND ANALOGOUS MACHINE.

1,090,757.

Specification of Letters Patent.

Patented Mar. 17, 1914.

Application filed August 4, 1913. Serial No. 782,873.

*To all whom it may concern:*

Be it known that I, HERBERT SHACKLETON, a subject of the King of Great Britain, residing at Malsis Mount, Keighley, in the county of York, England, have invented certain new and useful Improvements in and Relating to Spinning, Twisting, and Analogous Machines, of which the following is a specification.

This invention which is for improvements in and relating to spinning, twisting, and analogous machines, refers to doffing mechanism therefor of the kind in which caps or fliers, as the case may be, and bobbins are doffed mechanically, and the invention has for object an improved method of and means for effecting the "piecing up" mechanically of the threads on to the empty bobbins prior to re-commencing to spin after doffing.

The means for mechanically "piecing-up" the threads, as hitherto devised, have almost invariably possessed the disadvantages that the ends of the yarns or threads when broken tend to wind onto the whirls and, unwinding from the full bobbins, become entangled with the driving tapes.

According to the present method each yarn or thread is laid about or looped upon its appropriate empty bobbin so that the end of the thread is secured thereto on the rupture of the threads. For this purpose the bobbins upon which thread is to be wound are so manipulated relatively to the threads as to cause the threads to become looped or wrapped therearound in the form of a half-hitch. In order to achieve the desired result a number of holders for the empty bobbins are arranged upon a rail extending longitudinally of the machine and adapted to be moved angularly through 180°. Upon these angularly movable bobbin holders, which take the place of the usual rigidly mounted pegs, a supply of empty bobbins is arranged, and after the full bobbins have been doffed on to the usual row of full-bobbin pegs, by any suitable means, the bobbin holders with their corresponding empty bobbins thereon are manipulated in order to "piece up" the yarns or threads.

Any suitable means may be employed for severing the threads but it is found that the present invention enables the bobbin holders to be utilized with advantage, for, after the empty bobbins have been transferred to the spindles in readiness to re-commence the spinning operation, the threads extending between the empty bobbins and the full bobbins may be looped around the empty bobbin holders and fastened thereto by a half-hitch so that when the machine is re-started for spinning the threads are instantly ruptured between the empty bobbins and the empty bobbin holders without any tendency to draw thread off the full bobbins. The above mentioned empty bobbin holders take into the central bores of the bobbins and are preferably of a compressible construction so as to take a firm grip of the bobbins and retain same securely while being manipulated angularly. The rail for the full bobbin pegs as well as the rail carrying the empty bobbin holders may be mounted upon vertically movable rack pillars, and the requisite longitudinal and angular movements of the rails may be secured by appropriate hand levers, hand wheels or the like.

One construction of the invention is illustrated by way of example in the accompanying drawings in which only so much of a spinning frame and its mechanism as are necessary to the understanding of the invention have been shown.

Figure 1 is an end elevation. Fig. 2 is a front elevation of a part of the machine. Fig. 3 is a vertical section, the parts occupying the positions assigned to them just prior to the filling of the bobbins. Fig. 4 is a vertical section of a portion of the machine showing a bobbin in the course of being doffed. Fig. 5 is a view similar to Fig. 3 showing the full bobbin transferred to the full-bobbin peg. Fig. 6 is a detail view showing a step in the operation of "piecing-up." Fig. 7 is another detail view showing a further step in the "piecing-up" operation. Fig. 8 is a vertical section showing the parts in readiness to re-commence spinning and to sever the threads. Figs. 9 to 15 inclusive are diagrams of the various positions occupied by the "piecing-up" devices. Fig. 16 is a detail view of the bobbin-holder.

In order that the invention may be fully understood with facility, the doffing of the bobbins will be referred to, but the mechanism employed therefor forms no part of the present invention. All the parts other than those immediately associated with the "piecing-up" mechanism being referred to and illustrated merely as one example of the application of the invention.

The spindles 1 are provided with the usual tubes 2, and the full bobbins 3 and the empty bobbins 4 are transferred therefrom and thereto respectively by means of the holding devices carried upon horizontally reciprocable rack bars 5 which also carry means for supporting the caps during the doffing operation.

A rail 7 carries a row of pegs 8, as usual, for the reception of the full bobbins, said rail being mounted upon vertical rack pillars 9 which also carry an angularly movable rail 10 to which are fixed a row of empty bobbin holders 11, one holder opposite each spindle. These holders 11 take into the central bores of the bobbins, and, as shown in Fig. 16, said holders are preferably of a resilient or compressible construction so as to take a firm grip of the bobbins and retain same securely while being manipulated angularly. The rail 7 is movable longitudinally in the brackets wherein it is supported in order that the pegs 8 may, at certain periods of the doffing operations, not obstruct the actuation of the holders 11, and for this purpose the rail 7 is provided with a handle 12. The rail 10 is movable angularly in order to manipulate the holders 11 and is to that end provided with a handle 13.

14 is a hand lever for the manipulation of the rack bars 5 which carry the bobbin transfer devices. 15 is a hand wheel which is connected by gearing to the spindle rail 16, and 17 is a hand wheel for raising and lowering the row of pegs 8 and bobbin holders 11. The general functions of all these parts will be well understood by those skilled in the art, and, forming no part of the present invention, need no further description.

Normally the row of empty bobbin holders 11 project downwardly closely adjacent to the rail 7, as will be seen in Figs. 1, 2 and 3, in each of which figures an empty bobbin 4 is shown upon the holder 11; and in order to "piece-up" after the full bobbins 3 have been doffed, that is to say after the bobbins 3 have been passed from the position occupied by them in Fig. 3 to that occupied in Fig. 4 and thence to that in Figs. 5 and 9, the vertical rack pillars 9 are lowered slightly, as shown in Fig. 6, the rail 7 is moved longitudinally by handle 12 an amount equal to half the pitch of the spindles so that the pegs 8 are disposed as seen in Fig. 10. The bobbins 4 are at this time pointing vertically upward as in Fig. 5, and by means of the handle 13 the rail 10 is then moved angularly so as to carry the bobbin-holders 11 and empty bobbins 4 thereon down until they project forwardly in a horizontal plane, as shown in Figs. 6 and 11. The rail 7 is then slid back longitudinally an amount equal to a whole pitch of the spindles so that that portion of the yarns or threads which extend from between the nip of the drawing rolls 19, 19, and the full bobbins 3 are carried against the empty bobbins (see Fig. 12). The rail 10 is then turned angularly so as to carry the bobbin holders 11 forwardly or downwardly through another 90° (see Fig. 13), after which the rail 7 is slid a whole pitch to the right, wrapping the threads around the empty bobbins 4 (see Fig. 14), and then the rail 10 is turned angularly so as to carry the bobbin-holders 11 and empty bobbins 4 angularly upward through 180° to the position indicated in Figs. 7 and 15. This last angular movement of the empty bobbins has for effect to cause the threads which, by the relative movements of the parts as just described have become wrapped around the empty bobbins, to assume the formation of a half-hitch. Thus the threads passing from the nip of the drawing rolls 19, 19, to the full bobbins 3 are looped around the empty bobbins 4 intermediate to these two points. The empty bobbins 4 are then transferred on to the spindles 1 by means of the devices carried by the rack bars 5, sufficient "slack" being drawn off easily from the full bobbins 3 to permit this, and the caps 6 are replaced on the spindles.

Before or when spinning recommences it is necessary to sever the threads which extend between the full bobbins 3 and the empty bobbins 4, and this may be done by causing such threads, by a series of movements similar to those already described, to be looped around the empty bobbin holders 11 and fastened thereto by a half hitch (as in Fig. 8) so that when the machine is restarted for spinning the threads are instantly ruptured between the empty bobbins 4 and the empty bobbin holders 11 without any tendency to draw thread off the full bobbins 3. The full bobbins 3 are then removed by hand from the pegs 8, the ends of the threads around the holders 11 being sufficiently loose after the threads have broken to be drawn off without difficulty. By the above described method and by means of the apparatus referred to by way of example in reference thereto the piecing up of all the threads may be effected simultaneously and without any liability of the threads fouling any parts of the machine.

What I claim is:—

1. In spinning, twisting and analogous machines means for "piecing-up" the threads between the full bobbins when doffed and the empty bobbins, comprising a series of devices for carrying said full bobbins and a series of devices for carrying said empty bobbins, said two series of devices being capable of displacement relatively to one another to cause each thread to become looped or tied about its appropriate empty bobbin.

2. In spinning, twisting and analogous machines means for "piecing-up" the threads between the full bobbins when doffed and the empty bobbins, comprising a series of carriers for said full bobbins, and a series of carriers for said empty bobbins, said two series of carriers being capable of movement relatively to one another to cause all the threads simultaneously to become looped or tied about their appropriate empty bobbins.

3. In spinning, twisting and analogous machines means for "piecing-up" the threads between the full bobbins when doffed and the empty bobbins, comprising a series of pegs carried by a rail for the reception of said full bobbins, and a series of carriers for said empty bobbins, said series of pegs and said series of carriers being capable of movement relatively to one another to cause all the threads simultaneously to become looped or tied about their appropriate empty bobbins.

4. In spinning, twisting and analogous machines means for "piecing-up" the threads between the full bobbins when doffed and the empty bobbins, comprising a series of pegs carried by a rail for the reception of said full bobbins, said rail being slidable longitudinally, and a series of carriers for said empty bobbins, said carriers being mounted upon a rail, said series of pegs and said series of carriers being capable of coöperative relative movement to cause all the threads simultaneously to become looped or tied about their appropriate empty bobbins.

5. In spinning, twisting and analogous machines means for "piecing-up" the threads between the full bobbins when doffed and the empty bobbins, comprising a series of pegs carried by a rail for the reception of said full bobbins, said rail being slidable longitudinally, and a series of carriers for said empty bobbins, said carriers being mounted upon a rail, said rail being movable angularly to cause said carriers to coöperate with said longitudinally slidable series of pegs to constrain all the threads simultaneously to become looped or tied about their appropriate empty bobbins.

6. In spinning, twisting and analogous machines means for "piecing-up" the threads between the full bobbins when doffed and the empty bobbins, comprising a series of pegs for the reception of said full bobbins, said pegs being carried upon a longitudinally slidable rail, and a series of carriers for said empty bobbins, said carriers being mounted upon an angularly movable rail, the relative movements of said series of pegs and said series of carriers coöperating to cause all the threads simultaneously to become looped or tied about their appropriate empty bobbins.

7. In spinning, twisting and analogous machines means for "piecing-up" the threads between the full bobbins when doffed and the empty bobbins, comprising a series of pegs for the reception of said full bobbins, said pegs being carried upon a longitudinally slidable rail, means to slide said rail, a series of resilient carriers for said empty bobbins, said resilient carriers being mounted upon an angularly movable rail, and means to move said rail angularly, the relative movements of said series of pegs and of said series of resilient carriers coöperating to cause all the threads simultaneously to become looped or tied about their appropriate empty bobbins.

In testimony whereof I have hereunto set my hand in presence of two subscribing witnesses.

HERBERT SHACKLETON.

Witnesses:
J. N. CLARKSON,
FRED R. HARGREAVES.

---

Copies of this patent may be obtained for five cents each, by addressing the "Commissioner of Patents. Washington, D. C."